W. S. COLWELL.
Bisulphide of Carbon Engines.
No. 225,689. Patented Mar. 23, 1880.
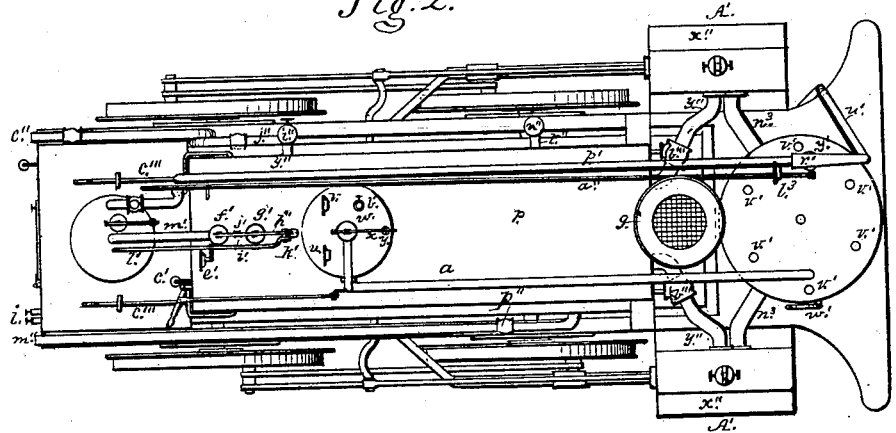
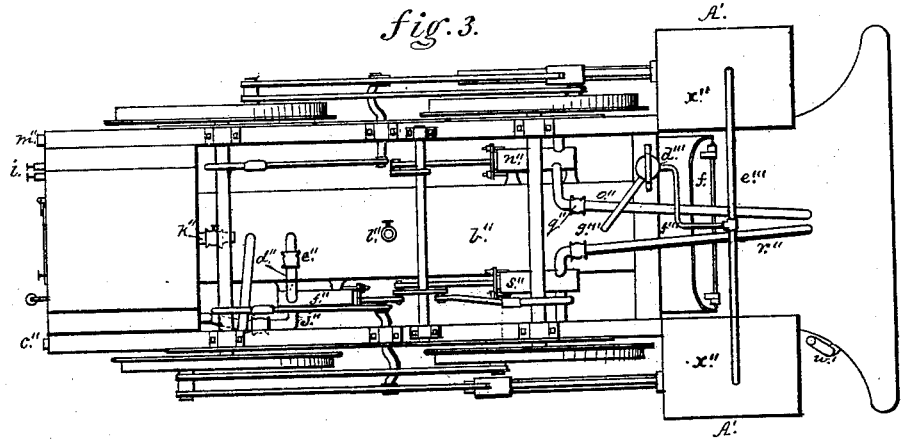
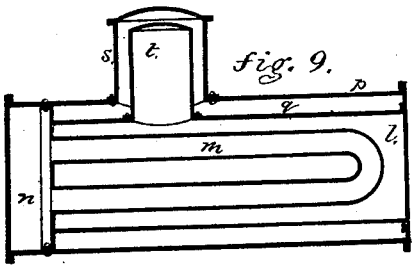
Witnesses
James J. Johnston
Andrew P. Davis
Inventor
William S. Colwell 3 Sheets—Sheet 3.
W. S. COLWELL.
Bisulphide of Carbon Engines.
No. 225,689.      Patented Mar. 23, 1880.
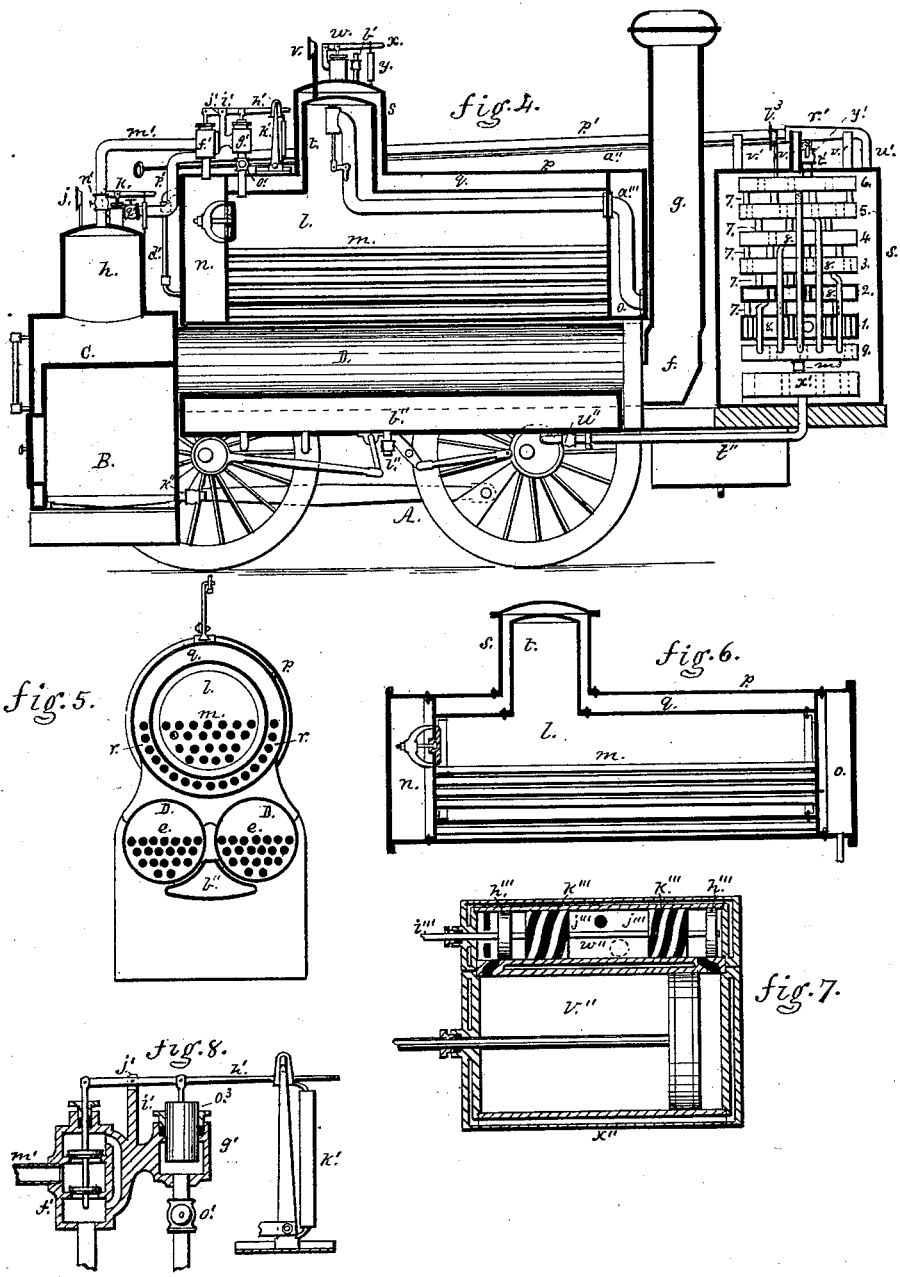
Witnesses
James J. Johnston
Andrew G. Davis
Inventor
William S. Colwell

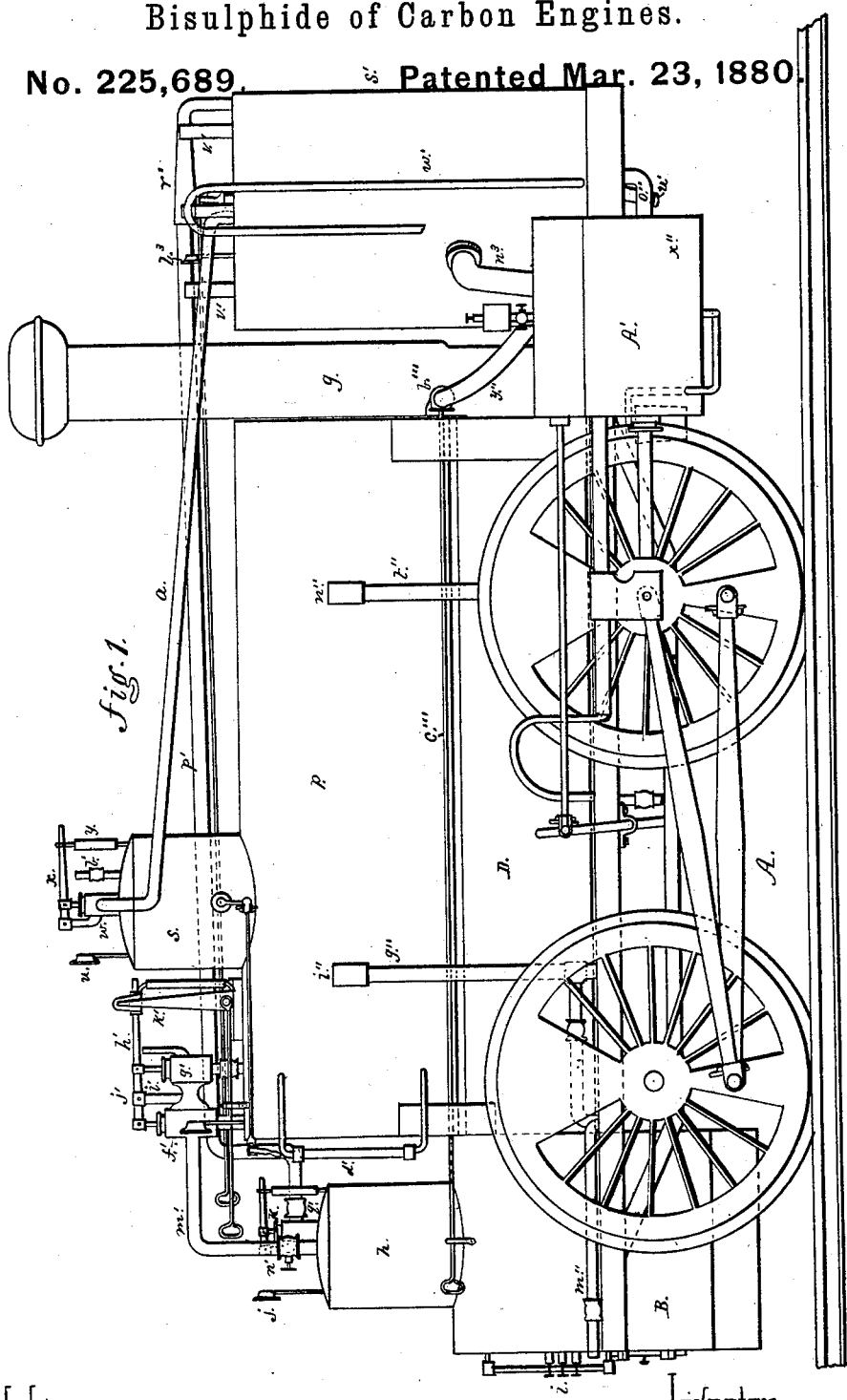

UNITED STATES PATENT OFFICE.

WILLIAM S. COLWELL, OF PITTSBURG, PENNSYLVANIA.

BISULPHIDE-OF-CARBON ENGINE.

SPECIFICATION forming part of Letters Patent No. 225,689, dated March 23, 1880.

Application filed October 24, 1879.

*To all whom it may concern:*

Be it known that I, WILLIAM S. COLWELL, of Pittsburg, in the county of Allegheny and State of Pennsylvania, have invented a certain new and useful Improvement in Bisulphide-of-Carbon-Vapor Engines; and I do hereby declare that the following is a full, clear, and exact description thereof, reference being had to the accompanying drawings, and to the letters of reference marked thereon.

The nature of my invention consists, first, in the use of bisulphide of carbon for a motor for locomotive-engines and other enginery by so applying heat to the bisulphide of carbon that a given temperature will be imparted to it, thereby obtaining a fixed or determined pressure of vapor in its evolving-chamber; second, in the use of bisulphide of carbon for a motor for locomotive-engines or other enginery by so applying heat to the bisulphide of carbon that a given or determined pressure will be obtained and not increased by augmentation of the bisulphide of carbon in its evolving-chamber; third, in the combination of one or more heat receiving and distributing chambers with the chamber or vessel in which the bisulphide of carbon is evolved into a vapor for a motor for locomotive-engines or other enginery; fourth, in the combination of two or more heat receiving and distributing chambers communicating with each other, a chamber or vessel in which the bisulphide of carbon is evolved into a vapor for a motor for locomotive-engines or other enginery, and a dry-pipe; fifth, in the combination of one or more heat receiving and distributing chambers with a chamber or vessel in which the bisulphide of carbon is evolved into a vapor for a motor, the latter chamber or vessel being inclosed in a casing for surrounding it with an uninflammable liquid or vapor; sixth, in the combination of one or more heat receiving and distributing chambers communicating with each other, and a chamber or vessel in which the bisulphide of carbon is evolved into a vapor for a motor, said chamber or vessel being inclosed in a casing for surrounding it with an uninflammable liquid or vapor, and a safety-valve; seventh, in the combination of a steam or heat generator with one or more steam or heat receiving and distributing chambers, and a chamber or vessel for evolving the bisulphide of carbon into a vapor for a motor, and a safety-valve; eighth, in the combination of a steam or heat generator with one or more steam or heat receiving and distributing chambers communicating with each other, regulating valve or valves, a chamber or vessel for evolving the bisulphide of carbon into a vapor for a motor, and an indicator-gage; ninth, in the combination of a steam or heat generator with one or more steam or heat receiving and distributing chambers and a chamber or vessel for evolving the bisulphide of carbon into a vapor for a motor, said chamber or vessel being inclosed in a casing for surrounding it with an uninflammable liquid or vapor; tenth, in the combination of a steam or heat generator with one or more steam or heat receiving and distributing chambers, regulating valve or valves, safety-valve, a chamber or vessel for evolving the bisulphide of carbon into a vapor for a motor, said chamber or vessel being inclosed in a casing for surrounding it with an uninflammable liquid or vapor, and an indicator-gage; eleventh, in the combination of a furnace surrounded with a water-chamber communicating with two boilers furnished with flues communicating with a single breeching and stack, and a steam dome communicating with said chamber, boilers, and a chamber or vessel in which bisulphide of carbon is evolved into a vapor for a motor; twelfth, in the combination of a furnace surrounded with a water-chamber communicating with two boilers furnished with flues communicating with a single breeching and smoke-stack, and a steam-dome communicating with said chamber, boilers, and an evolving chamber or vessel for evolving the bisulphide of carbon into a vapor for a motor, said evolving-chamber being inclosed in a case for surrounding it with an uninflammable liquid or vapor; thirteenth, in the combination of a furnace surrounded with a water-chamber communicating with two boilers furnished with flues communicating with a single-breeching and smoke-stack, and a steam-dome communicating with said chamber, boilers, and an evolving chamber or vessel for evolving the bisulphide of carbon into a vapor for a motor, said evolving-chamber having a steam receiving and distributing-chamber; fourteenth, in the combination of a furnace surrounded with a water-chamber communicating with two boilers furnished with flues communicating with a single breeching and smoke-stack, and a steam-dome communicating with said chamber, and an evolving-chamber for evolving the bisulphide of carbon into a vapor for a motor, said evolving-chamber having two or more steam receiving and distributing chambers communicating with each other; fifteenth, in the combination of valves for automatically regulating the flow of steam into a receiving chamber or chambers connected with an evolving chamber or vessel for evolving the bisulphide of carbon into a vapor for a motor, and a steam-boiler communicating with said valves and said receiving chamber or chambers; sixteenth, in the combination of valves connected to a lever having an adjustable tension spring or weight which may be adjusted thereon at the will of the operator, said valves also automatically regulating the flow of steam into a receiving chamber or chambers connected with an evolving chamber or vessel for evolving the bisulphide of carbon into a vapor for a motor, and a steam-boiler communicating with said valves and said receiving chamber or chambers; seventeenth, in the combination of a water-chamber placed under the steam-boilers and communicating with a water-supply and said boilers, a chamber surrounding the evolving-chamber for evolving the bisulphide of carbon into a vapor for a motor, and pumps and pipes connected therewith; eighteenth, in a condenser consisting of a series of shallow chambers arranged one above the other and communicating with each other and with a chamber or reservoir for the bisulphide of carbon, the whole being inclosed in a casing and surrounded with water; nineteenth, in a condenser consisting of a series of shallow chambers arranged one above the other and communicating with each other and with a chamber or reservoir for the bisulphide of carbon, the whole being inclosed in a casing and surrounded with water, and combined with an air-blast; twentieth, in a bisulphide-of-carbon engine, a cylindrical slide-valve arranged on a valve-stem having carriers provided with spiral packing-recesses; twenty-first, in a chamber or vessel for evolving bisulphide of carbon into a vapor for a motor, a vapor-dome, said chamber or vessel and its dome inclosed in a casing for surrounding them with an uninflammable liquid or vapor.

To enable others skilled in the art with which my invention is most nearly connected to make and use it, I will proceed to describe its construction and operation.

In the accompanying drawings, which form part of my specification, Figure 1 is a side elevation of a locomotive-engine provided with my improvements for using and utilizing bisulphide of carbon as a motor. Fig. 2 is a top view or plan of the same. Fig. 3 is an inverted view of the same. Fig. 4 is a vertical section of the same. Fig. 5 is a transverse section of the steam-boilers, chamber or vessel for evolving the bisulphide of carbon into a vapor for a motor, and the casing inclosing said chamber. Fig. 6 is a vertical and longitudinal section of the chamber or vessel for evolving the bisulphide of carbon into a vapor for a motor, the steam receiving and distributing chambers, and the casing for inclosing said evolving chamber or vessel for surrounding it with an uninflammable liquid or vapor. Fig. 7 is a vertical and longitudinal section of the cylinder, steam-chest, and slide-valve of the engine. Fig. 8 is a vertical and longitudinal section of the regulating-valves used in combination with the steam or heat generator and the chamber or vessel for evolving the bisulphide of carbon into a vapor for a motor. Fig. 9 represents a modification of the heating-chamber.

It is a discovered fact that bisulphide of carbon, when subjected to about 118° of heat (Fahrenheit) will become vaporized. I have discovered that the pressure of said vapor, when confined for a motor, may be with perfect safety increased when desired, and at the will of the operator, to one hundred and eighty-six (186) pounds to the square inch of surface of the internal walls of the chamber or vessel used for evolving the bisulphide of carbon into a vapor by the proper application of about 295° of heat, (Fahrenheit,) and that said pressure will not be increased by augmenting the quantity of the bisulphide of carbon in said evolving chamber or vessel.

To enable others to use and utilize this discovery of this property in bisulphide of carbon for a safe and efficient motor for locomotive-engines and other enginery, I will describe its principle of operation and one set of devices for carrying it into effect.

In the accompanying drawings, A represents the running-gear of a locomotive, upon which is mounted a furnace, B, surrounded with a water-chamber, C, which communicates with two boilers, D, provided with flues $e$, which communicate with a single breeching, $f$, and smoke-stack $g$. The water-chamber C is provided with a steam-dome, $h$, try-gages $i$, pressure-gage $j$, and safety-valve $k$, all of which are of ordinary construction and operation. Above and directly over the steam-boilers D is arranged the chamber or vessel $l$, for evolving the bisulphide of carbon into a vapor for a motor for operating the locomotive-engines A'. The evolving-chamber $l$ is provided with a series of flues, $m$, which communicate with steam receiving and distributing chambers $n$ and $o$. The evolving-chamber $l$ is inclosed in a casing, $p$, for surrounding the evolving chamber or vessel $l$ with an uninflammable liquid or vapor. The chamber $q$, formed by the casing $p$, is provided with a series of flues, $r$, communicating with the receiving and distributing chambers $n$ and $o$. The casing $p$ is provided with a dome, $s$, which incloses a dome, $t$, on the chamber or vessel $l$. On the upper end of the dome $s$ are arranged pressure-gages $u$ and $v$—the gage $u$ for indicating the pressure of vapor in the chamber or vessel $l$, and the gage $v$ for showing the pressure of steam in the chamber $q$. The dome $s$ is also provided with a safety or blow-off valve, $w$, the lever $x$ of which is provided with a tension spring or weight, $y$. This safety or blow-off valve communicates with the dome $t$ of the evolving chamber or vessel $l$ and with the condenser through the medium of a pipe $a'$. The dome $s$ is provided with a vent or blow-off valve, $b'$, which is used for blowing off steam or any gas that may be in the chamber $q$.

The evolving chamber or vessel $l$ is provided with a glass indicator, $c'$, for showing the quantity of bisulphide of carbon in said chamber or vessel, and the chamber $q$ is provided with a similar indicator, $d'$, for showing the quantity of water in said chamber $q$.

The steam or heat receiving and distributing chamber $n$ is furnished with a pressure-gage, $e'$, for showing the pressure of the steam in said chamber and the parts connected therewith. The steam or heat receiving and distributing chamber is provided with a regulating-valve, $f'$, and the evolving chamber or vessel $l$ also provided with a regulating-valve, $g'$. The stems of said valves are attached to a lever, $h'$, pivoted to a post, $i'$, at $j'$, and said lever is furnished with an adjustable tension spring or weight, $k'$, operated by a shifting-rod, $l'$.

The construction of the regulating-valves $f'$ $g'$ and lever $h'$ is clearly shown in Fig. 8. The valve $f'$ communicates with the steam-dome $h$ through the medium of a pipe, $m'$, furnished with a stop-valve, $n'$. The regulating-valve $g'$ is provided with a stop-valve, $o'$.

To the steam-dome $h$ is connected a pipe, $p'$, furnished with a stop-valve, $q'$. This pipe $p'$ passes forward over and above the casing $p$, and is connected to a steam-siphon, $r'$, on the upper end of the casing $s'$ of the condenser. The steam-siphon $r'$ has a branch, $t'$, which communicates with the upper chamber of the condenser, and to the forward end of the steam-siphon $r'$ is attached a conductor-pipe, $u'$. The pipe $p'$, steam-siphon $r'$, and conducting-pipe $u'$ are used for forming a partial vacuum in the condenser, to avoid back action on the pistons of the engines, which exhaust the vapor of the bisulphide of carbon into the condenser after it has performed its office in the cylinders of the engines.

The casing $s'$ of the condenser is furnished with a series of pipes, $v'$, for carrying off the heated vapor from water in the casing $s'$. The pipe $w'$ is connected to the casing $s'$ near its lower end, the other end of said pipe being connected to a suitable air-blast device.

The object of the air-blast and pipe $w'$ is for forcing air up through the water in the casing $s'$ and around the condenser, the air in its upward passage carrying off the heat in the water, which takes up heat in the operation of condensing the exhausted vapor of bisulphide of carbon.

The condenser consists of the casing $s'$, with a series of shallow chambers, 1, 2, 3, 4, 5, and 6, arranged one above the other, with water-space between each, and communicating with each other by a series of short pipes, 7, and all of said shallow chambers communicating, by means of pipes 8, with the chamber 9, which communicates with the reservoir $x'$ for the bisulphide of carbon.

The branch $t'$ of the steam-siphon $r'$ is furnished with a stop-valve, $y'$, which is opened and closed through the medium of the rod $a''$. This stop-valve $y'$ is used for cutting off communication between the condenser and steam-siphon.

On the under side of the boilers D is placed a water-chamber, $b''$, which communicates, by means of a pipe, $c''$, with the water-tank of the locomotive-tender, and by means of a pipe, $d''$, having a check-valve, $e''$, communicates with a force-pump, $f''$, which communicates with the chamber $q$, which surrounds the evolving chamber or vessel $l$, by means of a pipe, $g''$, furnished with a stop-valve, $h''$, and check-valve $i''$. The pipe $g''$ communicates with water-chamber C, which surrounds the furnace B, by means of a pipe, $J''$, provided with a check-valve. The water-chamber C is provided with a blow-off valve, $k''$, and the water-chamber $b''$ with a waste-valve, $l''$.

The pipe $m''$ communicates with the water-tank of the locomotive-tender and with the force-pump $n''$, which, by means of pipe $o''$, communicates with the condenser. The pipe $m''$ is furnished with a stop-valve, $p''$, and the pipe $o''$ with a check-valve, $q''$.

The reservoir $x'$ communicates, by means of a pipe, $r'''$, with a force-pump, $s''$, which, by means of a pipe, $t''$, furnished with a check-valve, $u''$, communicates with the evolving chamber or vessel $l$.

The force-pumps $f''$, $n''$, and $s''$ are operated by rock-shafts and cam-connections of ordinary construction and operation.

The cylinders $v''$ and steam-chests $w''$ are of ordinary construction, and are inclosed in a casing, $x''$, thereby forming a chamber around them which communicates with the receiving and distributing chamber $o$ by means of pipes $y''$, which surround the supply-pipes $a'''$, which communicate with the evolving chamber or vessel $l$ and the steam-chests $w''$ of the cylinders $v''$ of the engines A'. The pipes $y''$ are provided with valves $b'''$, which are operated by rods $c'''$ by the engineer from the pilot-house of the locomotive, who also operates the throttles of the supply-pipes $a'''$ in the usual manner and by the ordinary means.

The casing $x''$ of the cylinders and steam-chests is connected with a steam-trap, $d'''$, by means of pipes $e'''$ and $f'''$, and the trap $d'''$ communicates with the water-chamber $b''$ by means of the pipe $g'''$.

The slide-valves $h'''$ of the engines A' are cylindrical and secured on the valve-stem $i'''$, on which are also secured hollow carriers $j'''$, which are furnished with spiral packing-recesses $k'''$. By combining the carriers $j'''$ with the slide-valves $h'''$ the latter wear evenly, and all cutting of the valves and valve-seats will be prevented and the valves will be perfectly balanced.

Having thus described the several parts of the apparatus and their relation to each other, I will proceed to describe briefly the operation, which is as follows: The water-chambers C and boilers D and condenser being properly supplied with water, and the evolving-chamber $l$ and the reservoir $x'$ charged with bisulphide of carbon, the safety-valve $k$ is adjusted for the desired pressure of steam. The regulating-valves $f'$ and $g'$ are adjusted to the pressure of steam desired for evolving the bisulphide and for obtaining the desired pressure of vapor for a motor, and the pipe $w'$ connected to an air-blast device. The operator then makes a fire in the furnace B, which will generate steam in boilers D, the pressure of which will be indicated by the pressure-gage $j$. The steam, as soon as it is generated, passes through the pipe $m'$ into the valve $f'$, and through it into the receiving and distributing chamber $n$, and, passing through the flues $m$ and $r$, enters the receiving and distributing chamber $o$, and by opening the valves $b'''$ passes through pipes $y''$, and enters the casing $x''$ around the cylinder $v''$ and steam-chest $w''$, the steam, in its passage, gradually heating the bisulphide of carbon in the evolving chamber or vessel $l$, and evolving it into a vapor of the desired pressure for a motor, and also heating the water in the chamber $q$, and thereby generating steam in said chamber, and also heating the supply-pipe $a'''$ in its passage into the casing $x''$, where it heats the cylinders $v''$ and steam-chests $w''$ of the engines A', the condensed steam, in the form of hot water, flowing from the casings $x''$ into pipe $e'''$, and from it into the pipe $f'''$, and through it into the trap $d'''$, and from it, through pipe $g'''$, into the water-chamber $b''$, from which, through the medium of pipes $d''$ and $g''$ and the force-pump $s''$, is forced into the chambers C and $q$, thereby retaining the latent heat of the steam.

The operator, before opening the throttles for starting the engines, opens the valve $q'$, allowing steam to pass through pipe $p'$ to the steam-siphon $r'$, for the purpose of exhausting air from the chambers 1 to 6, inclusive, of the condenser, so as to form a partial vacuum in said chambers, the amount of vacuum being indicated by the vacuum-gage $l^3$, care being taken to close the valve $m^3$ between the reservoir $x'$ and chamber 9; otherwise a loss of bisulphide of carbon will be the result. The air having been partially exhausted from the condensing-chambers of the condenser, the valve $q'$ closed, and the valve $m^3$ opened, the operator opens the throttle of the pipe $a'''$ and starts the engines. The vapor of the bisulphide of carbon having performed its office on the pistons of the engines is exhausted into the exhaust-pipes $n^3$, and from them passes into the condensing-chamber 1, and from it, through pipes 7, into chamber 2, and on up through the whole series of chambers, the condensed bisulphide of carbon flowing down through the pipes 8 into the chamber 9, and from it into reservoir $x'$, and from it, through pipe $r''$, to the force-pump $s''$, which forces it, through pipe $t''$, into the evolving chamber or vessel $l$, and thus the bisulphide of carbon is worked over and over any desired number of times. The amount of heat applied to the bisulphide of carbon will depend on the pressure of the steam admitted into the receiving and distributing chambers $n$ and $o$ and the manner of its admission into said chambers.

By the peculiar construction and arrangement of the regulating-valves $f'$ and $g'$ any desired pressure of the vapor of the bisulphide of carbon may be had for a motor, and said pressure maintained by adjustment of the tension spring or weight $k'$ with relation to the lever $h'$. Having decided on a fixed pressure, if the pressure in the evolving chamber or vessel $l$ should become more than that it will press up the plunger $o^3$ of valve $g'$ and close the valve $f'$, and thereby cut off the supply of steam from the heat receiving and distributing chambers $n$ and $o$, which will soon lower the pressure. When the pressure falls below that fixed upon, the plunger $o^3$ will sink, and thereby open the valve $f'$ and admit more steam or heat into the heating-chambers $n$ and $o$ and increase the pressure in the evolving chamber or vessel $l$ to that desired.

By the arrangement of the regulating-valves $f'$ and $g'$ and tension spring or weight $k'$, which can be adjusted at the will of the operator, so that any desired quantity and degree of heat may be admitted into the receiving and distributing chambers $n$ and $o$, the bisulphide of carbon in the evolving chamber or vessel can be slowly or rapidly evolved into a vapor for a motor of any desired power, which adapts it to all the requirements for operating locomotives and other enginery where sudden increase of power is required.

By the discovery of the inherent property in bisulphide of carbon—to wit, that charging an additional quantity of it into the evolving chamber or vessel does not increase the volume or pressure of its vapor when subjected to a given heat, and that volume and increased pressure are only obtained by an increase of heat—the engineer will understand that by husbanding heat in the heat-generator he can, by the proper manipulation of the regulating-valves $f'$ and $g'$, rein this wonderful and heretofore mysterious power, and control it at will for the purpose of a motor for operating machinery with great economy and perfect safety.

In the use of heated vapors of bisulphide of carbon for a motor two difficulties have been encountered, to wit: First, the great tendency of the working-surfaces of the cylinder, piston, slide-valve, and its seat to become rough by oxidation caused by the action of the atmosphere upon said surfaces when the engine has cooled off and is not running, which tendency to oxidation is due to some unexplained effect produced on said surfaces by the heated vapor of bisulphide of carbon. Second, experience has demonstrated that the ordinary oils, when subjected in the valve-chamber and cylinder of the engine to heated vapors of bisulphide of carbon, from some unknown cause, do not act well as a lubricant, and do not protect the aforesaid working-surfaces from oxidation. Hence glycerine, caoutchouc, and petroleum-oil have each been resorted to as the best articles for a suitable lubricant for engines when heated vapor of bisulphide of carbon is used as a motor; but these articles fail to fully meet the requirements for a good lubricant in such case, and do not effectually protect said working-surfaces from oxidation. This tendency of the working-surfaces of the cylinder, its piston, and slide-valve and its seat to become rough and coated with oxide, which, by subsequent movements of the piston and valve, causes said oxide to grind and wear said working-surfaces, and the want of a reliable lubricant for relieving said parts from undue friction and oxidation, have been the great obstacle to the use of heated vapor of bisulphide of carbon for a motor.

I have discovered a method and means for obviating these difficulties—viz., by the use of finely-pulverized black lead or plumbago, combined with oil and applied to said working-surface, which articles, when combined, serve the twofold purpose of preventing oxidation of said working-faces, and also act as a most excellent lubricant, meeting all the requirements demanded, and avoiding the grinding, wearing, and undue friction of the said working-surfaces.

In applying the finely-pulverized black lead or plumbago it is thoroughly mixed with oil, (by preference petroleum-oil, which, by experience, has been found to be the most efficient as a lubricant in a bisulphide-of-carbon engine, but not meeting all the requirements.) These two well-known lubricants being thoroughly combined, so as to form a homogeneous mixture, are fed into the valve-chamber and cylinder of the engine in the usual manner and by the ordinary means for lubricating the cylinder, piston, and valves of an engine.

When the heated vapor of the bisulphide of carbon comes in contact with the mixture of oil and black lead or plumbago it parts with a portion of its sulphur, which mechanically combines with the black lead or plumbago, and thereby forms a varnish or lacquer, which, by the movements of the valve and piston of the engine, is spread over the working-surfaces of the piston, cylinder, valve, and its seat, giving to said surfaces a coating which is very smooth and impervious to the action of the atmosphere, and prevents oxidation of said working-surfaces of the engine.

Having thus described my improvement, what I claim as of my invention is—

1. In the use of bisulphide of carbon for a motor for operating machinery, the method of applying heat to bisulphide of carbon so that a given temperature will be imparted to it and a determined volume and pressure of vapor obtained for a motor, substantially as hereinbefore described.

2. In the use of bisulphide of carbon for a motor for operating machinery, the method hereinbefore described for applying heat to the bisulphide of carbon, that a given volume and pressure of its vapor will be obtained for a motor and not increased or diminished by augmenting the quantity of bisulphide of carbon in the evolving-chamber.

3. In an apparatus for utilizing bisulphide of carbon for a motor for operating machinery, the combination of one or more heat receiving and distributing chambers, regulating valve or valves, and an evolving-chamber, all arranged substantially as herein described, and for the purpose set forth.

4. In an apparatus for utilizing bisulphide of carbon for a motor for operating machinery, the combination of one or more heat receiving and distributing chambers, a regulating valve or valves, an evolving-chamber, and dry-pipe, all arranged substantially as herein described, and for the purpose set forth.

5. In an apparatus for utilizing bisulphide of carbon for a motor for operating machinery, the combination of one or more heat receiving and distributing chambers, regulating valve or valves, and an evolving-chamber inclosed in a casing for surrounding it with an uninflammable liquid or vapor, all arranged substantially as herein described, and for the purpose set forth.

6. In an apparatus for utilizing bisulphide of carbon for a motor for operating machinery, the combination of one or more heat receiving and distributing chambers, regulating valve or valves, an evolving-chamber inclosed in a casing for surrounding it with an uninflammable liquid or vapor, and a safety-valve, all arranged substantially as herein described, and for the purpose set forth.

7. In an apparatus for utilizing bisulphide of carbon for a motor for operating machinery, the combination of a steam or heat generator, one or more steam or heat receiving and distributing chambers, regulating valve or valves, an evolving-chamber, and a safety-valve, all arranged substantially as hereinbefore described, and for the purpose set forth.

8. In an apparatus for utilizing bisulphide of carbon for a motor for operating machinery, the combination of a steam or heat generator, one or more steam or heat receiving and distributing chambers, regulating valve or valves, an evolving-chamber, and an indicator-gage, all arranged substantially as herein described, and for the purpose set forth.

9. In an apparatus for utilizing bisulphide of carbon for a motor for operating machinery, the combination of a steam or heat generator, one or more steam or heat receiving and distributing chambers, regulating valve or valves, and evolving-chamber inclosed in a casing for surrounding it with an uninflammable liquid or vapor, arranged substantially as herein described, and for the purpose set forth.

10. In an apparatus for utilizing bisulphide of carbon for a motor for operating machinery, the combination of a steam or heat generator, one or more steam or heat receiving and distributing chambers, regulating valve or valves, safety-valve, an evolving-chamber inclosed in a casing for surrounding it with an uninflammable liquid or vapor, and an indicator-gage, all arranged substantially as herein described, and for the purpose set forth.

11. In an apparatus for utilizing bisulphide of carbon for a motor for operating machinery, the combination of a furnace surrounded with a water-chamber communicating with two boilers communicating with a single breeching and smoke-stack, a steam-dome communicating with said chamber and boilers, and evolving-chamber, all arranged substantially as herein described, and for the purpose set forth.

12. In an apparatus for utilizing bisulphide of carbon for a motor, the combination of a furnace surrounded with a water-chamber communicating with two boilers with flues communicating with a single breeching and smoke-stack, and evolving-chamber inclosed in a casing for surrounding it with an uninflammable liquid or vapor, all arranged substantially as herein described, and for the purpose set forth.

13. In an apparatus for utilizing bisulphide of carbon for a motor for operating machinery, the combination of a furnace surrounded with a water-chamber communicating with two boilers furnished with flues communicating with a single breeching and smoke-stack, a steam-dome communicating with said chamber and boilers, and evolving-chamber having a steam receiving and distributing chamber, all arranged substantially as herein described, and for the purpose set forth.

14. In an apparatus for utilizing bisulphide of carbon for a motor, the combination of a furnace surrounded with a water-chamber communicating with two boilers having flues communicating with a single breeching and smoke-stack, a steam-dome communicating with said chamber and boilers, and evolving-chamber inclosed in a casing for surrounding it with an uninflammable liquid or vapor, said evolving-chamber having two or more receiving and distributing chambers communicating with each other, arranged substantially as herein described, and for the purpose set forth.

15. In an apparatus for utilizing bisulphide of carbon for a motor for operating machinery, the combination of the regulating-valves $f'$ and $g'$, adjustable tension-spring $k'$, a steam-generator, and evolving-chamber $l$, having steam or heat receiving and distributing chambers $n$ and $o$, substantially as herein described, and for the purpose set forth.

16. In an apparatus for utilizing bisulphide of carbon for a motor for operating machinery, the combination of the water-chamber $b''$ with the chamber $q$ around the evolving-chamber $l$ and a steam-generator, substantially as herein described, and for the purpose set forth.

17. In an apparatus for utilizing bisulphide of carbon for a motor for operating machinery, the combination of a condenser consisting of a series of shallow chambers, arranged one above the other, and communicating with each other and a reservoir for bisulphide of carbon communicating with said shallow chambers, the whole inclosed in a casing and surrounded with water, substantially as herein described, and for the purpose set forth.

18. In an apparatus for utilizing bisulphide of carbon for a motor for operating machinery, the combination of a condenser consisting of a series of shallow chambers, arranged one above the other and communicating with each other, a reservoir for bisulphide of carbon, and a collecting-chamber, said chambers and reservoir communicating with each other through the medium of pipes 7 and 8, and the whole inclosed in a case and surrounded with water, substantially as herein described, and for the purpose set forth.

19. In an apparatus for utilizing bisulphide of carbon for a motor, the combination of a condenser consisting of chambers 1, 2, 3, 4, 5, 6, and 9, reservoir $x'$, communicating by pipes 7 and 8, steam-siphon $r'$, casing $s'$, and an air-blast device, substantially as herein described, and for the purpose set forth.

20. In a bisulphide-of-carbon engine, a cylindrical slide-valve arranged on a valve-stem with carriers provided with spiral packing-recesses, substantially as herein described.

21. A chamber for evolving bisulphide of carbon into a vapor for a motor, said chamber furnished with a vapor-dome, and chamber and dome inclosed in a casing for surrounding with an uninflammable liquid or vapor, substantially as herein described, and for the purpose set forth.

22. In a bisulphide-of-carbon engine, the method hereinbefore described for lubricating the working-surfaces of the cylinder, piston, valve or valves, and their seats, and preventing said surfaces from oxidation—viz., by mixing finely-pulverized black lead or plumbago with oil, and introducing it into the valve chamber or chambers and cylinder of the engine, substantially as specified.

WILLIAM S. COLWELL.

Witnesses:
JAMES J. JOHNSTON,
ANDREW J. DAVIS.